(12) United States Patent
Suzuki

(10) Patent No.: US 7,821,547 B2
(45) Date of Patent: Oct. 26, 2010

(54) IMAGE SENSING APPARATUS THAT USE SENSORS CAPABLE OF CARRYING OUT XY ADDRESSING TYPE SCANNING AND DRIVING CONTROL METHOD

(75) Inventor: Shoichi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 11/838,592

(22) Filed: Aug. 14, 2007

(65) Prior Publication Data

US 2008/0049132 A1 Feb. 28, 2008

(30) Foreign Application Priority Data

Aug. 25, 2006 (JP) .............................. 2006-229852

(51) Int. Cl.
H04N 5/235 (2006.01)
(52) U.S. Cl. .................. 348/226.1; 348/222.1; 359/229
(58) Field of Classification Search ............... 348/226.1
See application file for complete search history.

(56) References Cited

U.S. PATENT DOCUMENTS

2002/0158971 A1* 10/2002 Daiku et al. ............. 348/226.1
2004/0012692 A1* 1/2004 Arazaki .................... 348/226.1
2004/0051791 A1* 3/2004 Hashimoto ............... 348/226.1
2004/0080630 A1* 4/2004 Kim ........................ 348/226.1
2005/0046704 A1* 3/2005 Kinoshita ................ 348/226.1
2005/0093996 A1* 5/2005 Kinoshita ................ 348/226.1
2005/0246143 A1* 11/2005 Han et al. ................... 702/189
2006/0284992 A1* 12/2006 Kinoshita ................ 348/226.1

FOREIGN PATENT DOCUMENTS

JP 2002-314868 A 10/2002
JP 2003-189172 A 7/2003

* cited by examiner

*Primary Examiner*—David L Ometz
*Assistant Examiner*—Dwight Alex C Tejano
(74) *Attorney, Agent, or Firm*—Canon U.S.A., Inc. I.P. Division

(57) ABSTRACT

An image sensing apparatus has a first setting unit that sets a charge accumulation period in an image sensor to an integral multiple of ½ a flicker period, a second setting unit that, when a horizontal scan period, which is a period after commencement of reading out a preset line of the image sensor until commencement of reading out a line to be read out next, is changed to be shorter, sets a charge accumulation period of the image sensor immediately after a change in the horizontal scan period to a period that is an integral multiple of ½ the flicker period and is shorter than the charge accumulation period that has been set by the first setting unit, and a timing controller that controls the image sensor to achieve the charge accumulation periods set by the first and second setting units.

8 Claims, 11 Drawing Sheets

IMAGE SENSING APPARATUS THAT USE SENSORS CAPABLE OF CARRYING OUT XY ADDRESSING TYPE SCANNING AND DRIVING CONTROL METHOD

BACKGROUND OF THE INVENTION

1. Field of the Invention

The present invention relates to image sensing apparatuses that use image sensors having photoelectric converters and driving control methods of the image sensors, and particularly relates to image sensing apparatuses that use image sensors such as CMOS sensors capable of carrying out XY addressing type scanning and driving control methods of the image sensors.

2. Description of the Related Art

In recent years there are more and more cases of CMOS sensors being used in image sensing apparatuses such as digital cameras due to reasons including that they do not require complicated timing generation circuits, are low in cost, operate on a single power source, and involve low power consumption.

CMOS sensors offer a feature not possessed by CCD image sensors in that they are capable of reading out image signals of an arbitrary region only. While having such an advantage, when CMOS sensors undergo so called rolling shutter driving, a defect not present in CCD image sensors is produced known as in-frame flicker (hereinafter simply referred to as "flicker") since the charge accumulation timing for each line is shifted.

Here description is given concerning the flicker peculiar to CMOS sensors, which occurs when rolling shutter driving is performed. FIG. 10A and FIG. 10B are for describing a principle of flicker occurrence when a power source frequency is 50 Hz. As shown in FIG. 10A, when a fluorescent light or the like is lit by an AC power source having a frequency of 50 Hz, a quantity of light fluctuates at two times the frequency (100 Hz) of the power source frequency.

FIG. 10A also shows charge accumulation timings when imaging using a MOS-type image sensor having a charge accumulation period set to $1/30$ second under a fluorescent light whose brightness fluctuates cyclically. In this case, the output signal of pixels of the first line is a value in which the quantity of incoming light from a readout point A1 to B1 is integrated. Similarly, the output signal of pixels of the second line is a value in which the quantity of incoming light from a readout point A2 to B2 is integrated. Thereafter, the same is true until the final line. At this time, since the phase of the charge accumulation period with respect to the cycle in which the quantity of light of illumination varies for each line, the integrated values of the quantity of incoming light vary, and luminance fluctuation (flicker) appears in the frames. When the image sensor is constituted by 480 lines, the time required for reading out a single line is $1/14,400$ seconds ($=1/30 \div 480$ lines), and therefore phases of accumulation commencement timings match at cycles of 144 lines with respect to changes in the quantity of light of illumination. For this reason, the flicker in this case appears as fluctuation in the luminance level for cycles of 144 lines (FIG. 10B). When a CMOS sensor undergoes rolling shutter driving in this manner, luminance disparities occur in the frames.

To address these problems, Japanese Patent Laid-Open No. 2003-189172 discloses that when the power source frequency is 50 Hz, the shutter speed is set to n/100 seconds and when the power source frequency is 60 Hz, the shutter speed (charge accumulation period) is set to n/120 seconds. By controlling the shutter speed in this manner, the integrated values of the quantity of incoming light per line become equivalent and in-frame flicker can be prevented.

On the other hand, CMOS sensors also carry out readout control of image signals of only the required region when performing electronic zoom, which makes use of the CMOS characteristic of being able to perform readout of image signals of only an arbitrary region. For example, Japanese Patent Laid-Open No. 2002-314868 discloses that electronic zoom of a higher resolution is carried out for a wider zoom range by changing the readout region and driving method of an image sensor of an XY addressing type scanning method.

However, the following problems occur when changing the readout region or driving method of a CMOS sensor as described in Japanese Patent Laid-Open No. 2002-314868 while performing rolling shutter driving of the CMOS sensor in a state in which the shutter speed is fixed at n/100 seconds for example as described in Japanese Patent Laid-Open No. 2003-189172.

FIG. 11 shows charge accumulation timings and readout timings in a case where the driving method is changed and the readout period changes while capturing images or moving pictures or the like for an electronic viewfinder (EVF). It should be noted that in FIG. 11 the power source frequency is 50 Hz and the charge accumulation period is n/100 seconds. Furthermore, the timing for changing the driving method is set to during a vertical blanking period after the readout of one frame of image signals has been completed upon receiving an instruction to alter the driving method.

In FIG. 11, the driving method of the CMOS sensor is changed at a time t1 from an image sensing driving method A whose readout period is long to an image sensing driving method B, which has a readout period faster than that of the image sensing driving method A. In this case, the reset commencement time of frame 3 is before the time t1, and therefore in the period before the time t1, the reset period is the same as the readout period of the image sensing driving method A. However, since there is a switch to the image sensing driving method B from the time t1 onward, the resetting is carried out with the same period as the readout period in the image sensing driving method B. A result of the reset period change before and after the time t1 is that disparities occur in the charge accumulation periods at the top and bottom of the screen in frame 3 as is evident from FIG. 11.

Accordingly, it is conceivable to perform control such that brightness disparities at the top and bottom of the screen do not occur by setting the reset period in frame 3 to the same as the readout period after the switch in image sensing driving as shown by the bold lines in FIG. 11. However, a result of matching the reset period and the readout period in this manner is that the charge accumulation period is not n/100 seconds, and flicker occurs in frame 3.

SUMMARY OF THE INVENTION

The present invention has been made in consideration of the above situation, and has as its object to prevent in-frame flicker after changing the driving method when rolling shutter driving is performed on an image sensor capable of XY addressing type scanning.

According to an aspect the present invention, an image sensing apparatus is provided which includes a first setting unit that sets a charge accumulation period in an image sensor to an integral multiple of ½ a flicker period; a second setting unit that, if a horizontal scan period, which is a period after commencement of reading out a preset line of the image sensor until commencement of reading out a line to be read out next, is changed to be shorter, sets a charge accumulation period of the image sensor after a change in the horizontal scan period to a period that is an integral multiple of ½ the flicker period and is shorter than the charge accumulation period that has been set by the first setting unit; and a controller that controls the image sensor to achieve the charge accumulation periods set by the first and second setting units.

According to another aspect of the present invention, a driving control method is provided which includes a first setting step of setting a charge accumulation period in an image sensor to an integral multiple of ½ a flicker period; a second setting step of, if a horizontal scan period, which is a period after commencement of reading out a preset line of the image sensor until commencement of reading out a line to be read out next, is changed to be shorter, setting a charge accumulation period of the image sensor after a change in the horizontal scan period to a period that is an integral multiple of ½ the flicker period and is shorter than the charge accumulation period that has been set in the first setting step; and a control step of controlling the image sensor to achieve the charge accumulation periods set in the first and second setting steps.

Further features and aspects of the present invention will become apparent from the following description of exemplary embodiments (with reference to the attached drawings).

DESCRIPTION OF THE EMBODIMENTS

Various embodiments, features and aspects of the present invention will now herein be described in detail in accordance with the accompanying drawings.

First Exemplary Embodiment

[Image Sensing System Configuration]

Figure 1:
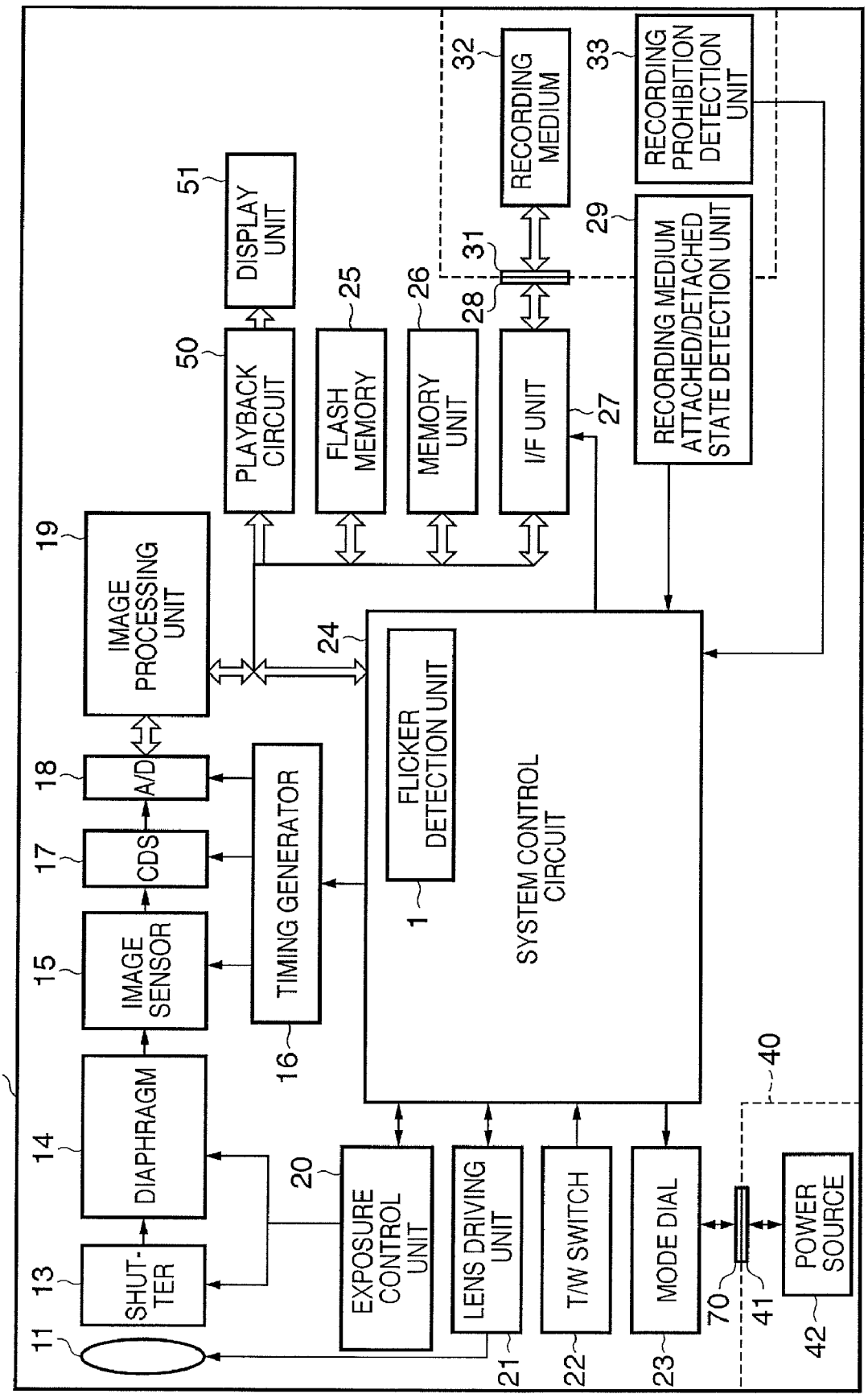
FIG. 1 is a block diagram showing an example configuration of an image sensing system according to a first embodiment of the present invention.

FIG. 1 is a block diagram showing a configuration of an image sensing system according to the present embodiment. In FIG. 1, numeral 10 indicates an image sensing apparatus. Numeral 11 indicates a lens in the image sensing apparatus 10. A single lens is shown in FIG. 1, but ordinarily there are multiple lenses. Numeral 13 indicates a mechanical shutter that blocks light beams to later stages and numeral 14 indicates a diaphragm that regulates light beams to later stages. Furthermore, numeral 15 indicates an image sensor, such as a CMOS sensor, capable of performing XY addressing type scanning, numeral 16 indicates a timing generator, which generates timing pulses required for the driving and sampling of the image sensor 15 and is controlled by a system control circuit 24. The system control circuit 24 has a flicker detection unit 1 and controls the timing generator 16 depending on a detection result of the flicker detection unit 1. The configuration and operation of the flicker detection unit 1 is described in more detail later. Numeral 17 indicates a CDS unit that carries out correlated double sampling (CDS) on the output of the image sensor 15 based on the timing pulses of the timing generator 16, and numeral 18 indicates an A/D converter that quantizes the output of the CDS unit 17 based on the timing pulses of the timing generator 16.

Numeral 19 indicates an image processing unit that receives the output of the A/D converter 18 and carries out various processes, and is constituted by a signal processing circuit, a reduction circuit, a raster block conversion circuit, and a compression circuit. Of these components, the signal processing circuit performs on the output data of the A/D converter 18 processing such as color carrier removal, aperture correction, and gamma correction and the like to generate luminance signals. The signal processing circuit simultaneously performs on the output data of the A/D converter 18 processing such as color interpolation, matrix conversion, gamma processing, gain adjustments and the like to generate color difference signals. Then, image data in a YUV format is output to a memory unit 26.

Furthermore, upon receiving output of the signal processing circuits, the reduction circuit carries out trimming and thinning, linear interpolation or the like on the inputted pixel data, thereby realizing reduction processing on the pixel data both horizontally and vertically. Upon receiving the processed data, the raster block conversion circuit converts raster scan image data, which has undergone scaling processing in the reduction circuit, to block scan image data. This series of image processing is achieved using the memory unit 26 as a buffer memory. The image data that has been converted to the block scan image data undergoes compression by block using JPEG compression in the compression circuit.

Numeral 20 indicates an exposure control unit that controls the mechanical shutter 13 and the diaphragm 14, and numeral 21 indicates a lens control unit that causes the lens 11 to move along an optical axis to focus an image of an object onto the image sensor 15. Furthermore, numeral 22 indicates a T/W (tele/wide) switch that enables setting of an angle of view by an electronic zoom, and numeral 23 indicates a mode dial for setting operation of the image sensing apparatus 10. In response to operation of the T/W switch 22 by the user, an electronic zoom is carried out by changing the driving method of the image sensor 15 for reading out charges from the image sensor 15 and changing the angle of view by processing the image signals that have been read out.

Next, description is given concerning one example of the driving method of the image sensor 15 in a case where electronic zoom is carried out.

Here, pixel signals can be read out using four different types of driving methods. A first driving method is set to read out four lines of pixel signals as one line of image signals from substantially the entire region of the image sensor 15, and a second driving method is set to read out three lines of pixel signals as one line of image signals from a region narrower than the first driving method. Furthermore, a third driving method is set to read out two lines of pixel signals as one line of image signals from a region narrower than the second driving method, and a fourth driving method is set to read out one line of pixel signals as one line of image signals from a region yet even narrower than the third driving method.

In each of the first to fourth driving methods, the time taken from starting reading out image signals from the image sensor 15 until outputting the read out signals is different. This is because the time involved in processing varies for each of the driving methods, since the number of lines read out is different, and also the number of output lines is different from the number of read out lines. A relationship of the angle of view is such that the first driving method>second driving method>third driving method>fourth driving method, with the first driving method providing the widest angle and the fourth driving method providing the most telescopic. Furthermore, a resolution relationship of the image data that has been read out is such that the first driving method<second driving method<third driving method<fourth driving method. It should be noted that methods of adding signals of a plurality of lines and skipping lines while reading lines, as well as methods of mixing the foregoing methods are conceivable for reading out multiple lines of pixel signals as one line of signals in the first to third driving methods.

Furthermore, that the number of lines integrated (or skipped) increases for wider angles of view originates in the major increases in pixel numbers in image sensors of recent years. Image capturing can be carried out in still image sensing using a multitude of pixels without being restricted by standards, while normally moving images are subjected to restrictions required by standards and an output target device involving the frame update rate or the number of pixels, and signals of all the pixels of the image sensor are not required. Consequently, it is only necessary to read out from the image sensor the image signals of the number of pixels (the number of lines) that satisfy these restrictions.

The various forms of control referred to above are carried out by the system control circuit 24, which is constituted by a CPU, interface circuits thereof, a direct memory access controller (DMAC), a bus arbiter, and the like. Programs executed by the CPU are stored in a flash memory 25.

Still referring to FIG. 1, numeral 40 indicates a battery box that holds a battery 42 in the image sensing apparatus 10, and includes the battery 42, which is a power source, and a connector 41. The image sensing apparatus 10 and the battery 42 are linked by the connector 41 connecting to a connector 70 of the image sensing apparatus 10.

Numeral 32 indicates a recording medium for recording images. Numerals 28 and 31 indicate connectors for linking the image sensing apparatus 10 and the recording medium 32. Numeral 33 indicates a recording prohibition detection unit that detects a state of a write-prohibiting switch of the recording medium 32. And numeral 29 indicates a recording medium attached/detached state detection unit that detects attachment/detachment of the recording medium 32. Furthermore, numeral 27 indicates an I/F unit that enables writing to and reading from the recording medium 32 via connectors 28 and 31.

Numeral 50 indicates a playback circuit that converts image data, which has been generated by the image processing unit 19 and stored in the memory unit 26, to image data suitable for display and transfers the image data to a monitor, and numeral 51 indicates a display unit such as an LCD. In the playback circuit 50, the YUV format image data is separated into luminance signals Y and color difference signals C, then D/A conversion is carried out and Y signals that have been analogized then undergo LPF processing. Furthermore, BPF filtering is executed on analog C signals, which have undergone D/A conversion, and only the frequency components of the color difference signals are extracted. Conversion to Y signals and RGB signals is performed based on the thus-generated signal components and sub-carrier frequencies, and the obtained Y signals and RGB signals are output to the display unit 51. It should be noted that an electronic viewfinder (EVF) function is achieved by successively processing and displaying the image data obtained from the image sensor 15.

It is noted that description was given for FIG. 1 concerning a configuration in which the lens 11 and the image sensing apparatus 10 are integrated, but it is also possible to configure a lens unit that enables the lens 11 to be detachable.

[Exemplary Image Sensor Configuration]

Figure 2:
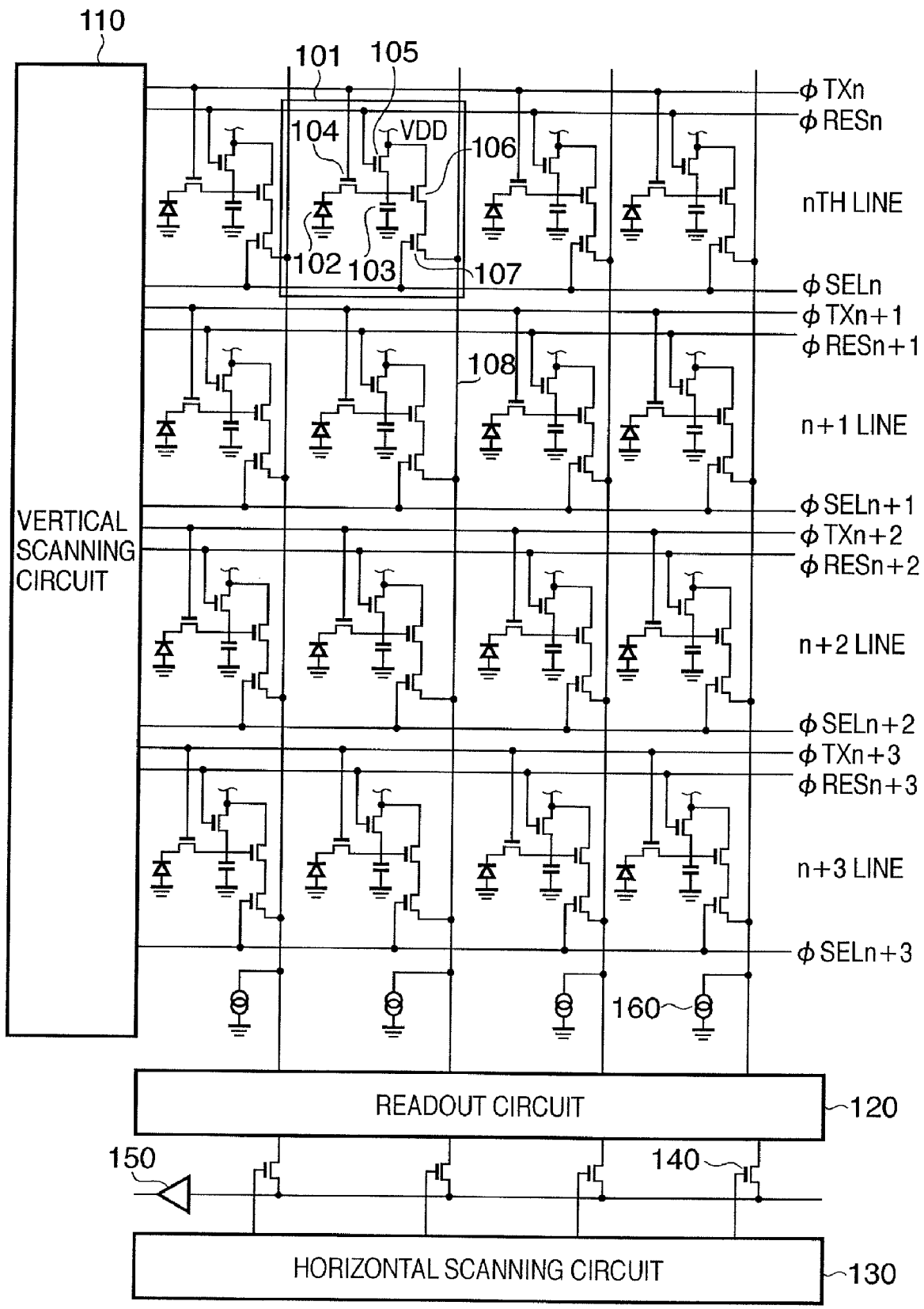
FIG. 2 is a circuit configuration diagram showing a part of an image sensor according to the first embodiment of the present invention.

FIG. 2 is a circuit configuration diagram showing a part of the image sensor 15 according to the first embodiment. The image sensor 15 according to the first embodiment is a CMOS sensor for example, which as stated above employs an XY addressing type scanning method. Four lines by four rows of pixels are shown in FIG. 2 to facilitate description, but in fact ordinarily there are several hundreds of thousands to several tens of millions of pixels lined up. Numeral 101 indicates a unit pixel. In an actual image sensor, unit pixels 101 are arranged two dimensionally with a predetermined aspect ratio. Furthermore, each of the unit pixels 101 is covered by a color filter of a hue of R, G, or B, and color filters are lined up in, for example, a Bayer arrangement.

In the unit pixel 101, numeral 102 indicates a photo diode (hereinafter "PD") that converts incoming light to an electrical charge, and numeral 103 indicates a floating diffusion portion (hereinafter "FD"), which is an accumulation region in which the charge generated by the PD 102 is temporarily accumulated. Numeral 104 indicates a transfer switch that transfers the charge generated by the PD 102 to the FD 103 by a transfer pulse φTX, and numeral 105 indicates a reset switch that eliminates the charge accumulated in the FD 103 by a reset pulse φRES. Numeral 106 indicates a MOS amplifier that functions as a source follower, and numeral 107 indicates a selection switch that selects a pixel by a selection pulse φSEL.

Gate electrodes of the transfer switches 104, the reset switches 105, and the selection switches 107 are respectively connected by line to signal lines that supply φTX, φRES, and φSEL, respectively, and selectively scanned by a vertical scanning circuit 110. Numeral 160 indicates a constant current source, which is the load of the MOS amplifier 106, and the unit pixel 101 and the constant current source 160 are connected by row to a readout circuit 120 via a signal output line 108. Numeral 140 indicates an output selection switch that selects a signal to be outputted from the readout circuit 120 and is driven by a horizontal scanning circuit 130. Numeral 150 indicates an output amplifier that outputs signals outputted from the readout circuit 120 to outside the image sensor 15.

It is noted that a one channel readout configuration is shown in the example shown in FIG. 2, but multiple channel readout configurations may be employed so to realize high speed readout. For example, readout circuits and horizontal scanning circuits for two channels can be provided such that odd number rows and even number rows are read out separately, and signals read out via the different channels are rearranged by the image processing unit 19.

[Determining Flicker Frequency]

Figure 3:
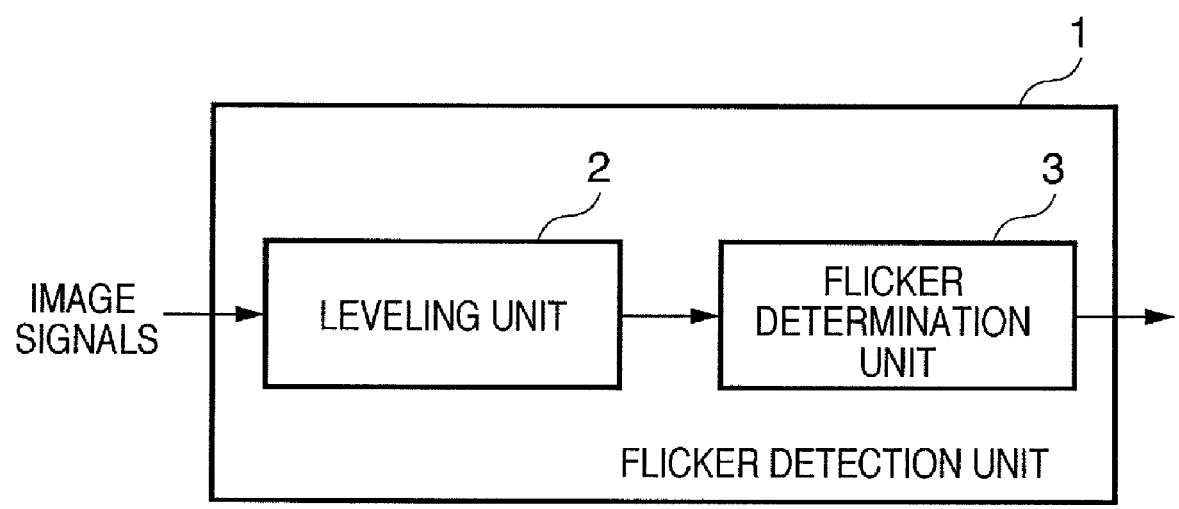
FIG. 3 is a block diagram showing an example configuration of a flicker detection unit according to the first embodiment of the present invention.

Next, description is given concerning the configuration of the flicker detection unit 1 and a method of determining flicker frequency carried out by the flicker detection unit 1. FIG. 3 shows an example configuration of the flicker detection unit 1 according to the present invention. The flicker detection unit 1 is provided with a leveling unit 2 and a flicker determination unit 3 that determines the presence/absence of flicker based on output of the leveling unit 2. It should be noted that in FIG. 1 the flicker detection unit 1 is shown as a component inside the system control circuit 24, however, it may be configured outside the system control circuit 24 as long as the system control circuit 24 is capable of obtaining the detection results of the flicker detection unit 1. Furthermore, the leveling unit 2 and the flicker determination unit 3 may be achieved using any of a hard logic, a digital signal processor (DSP), or software processing by a computer.

The leveling unit 2 receives image signals of an effective scan period that have been captured by the image sensor 15, then adds and averages the pixel levels of the inputted image signals for each line. The obtained average of an i-th line is referred to as AVEi. The flicker determination unit 3 performs frequency analysis on the average of each line obtained from the leveling unit 2 and determines the presence/absence of flicker.

Figure 4:
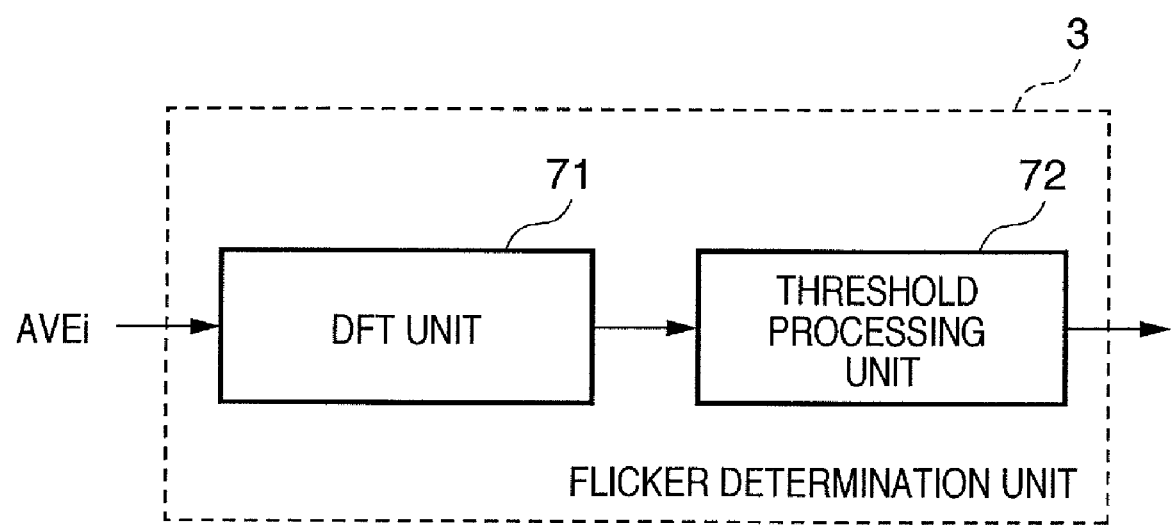
FIG. 4 is a block diagram showing an example configuration of a flicker determination unit according to the first embodiment of the present invention.

FIG. 4 shows a configuration example of the flicker determination unit 3. The flicker determination unit 3 is constituted by a discrete Fourier transform (DFT) unit 71 that receives the output of the leveling unit 2 and a threshold processing unit 72 that compares the output of the DFT unit 71 with a threshold to determine the presence/absence of flicker.

Figure 5A:
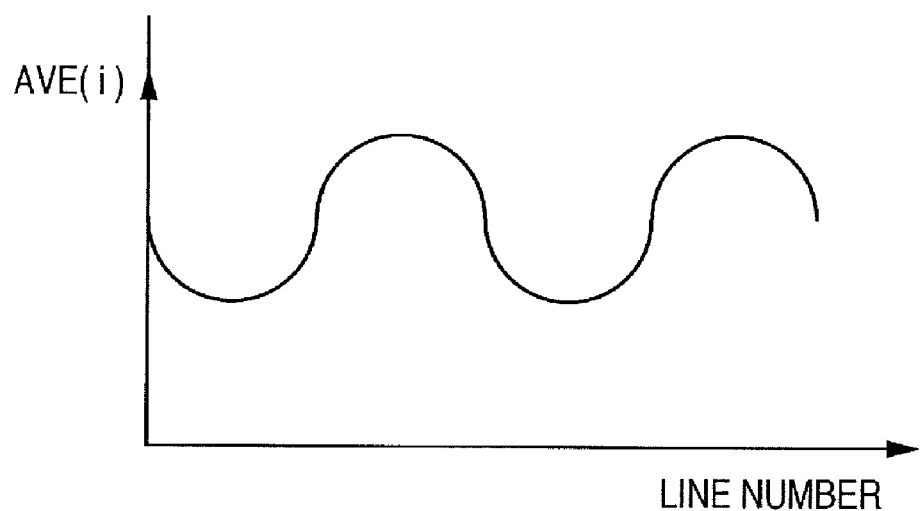
FIG. 5A and FIG. 5B are for describing an example flicker determination method according to the first embodiment of the present invention.
Figure 5B:
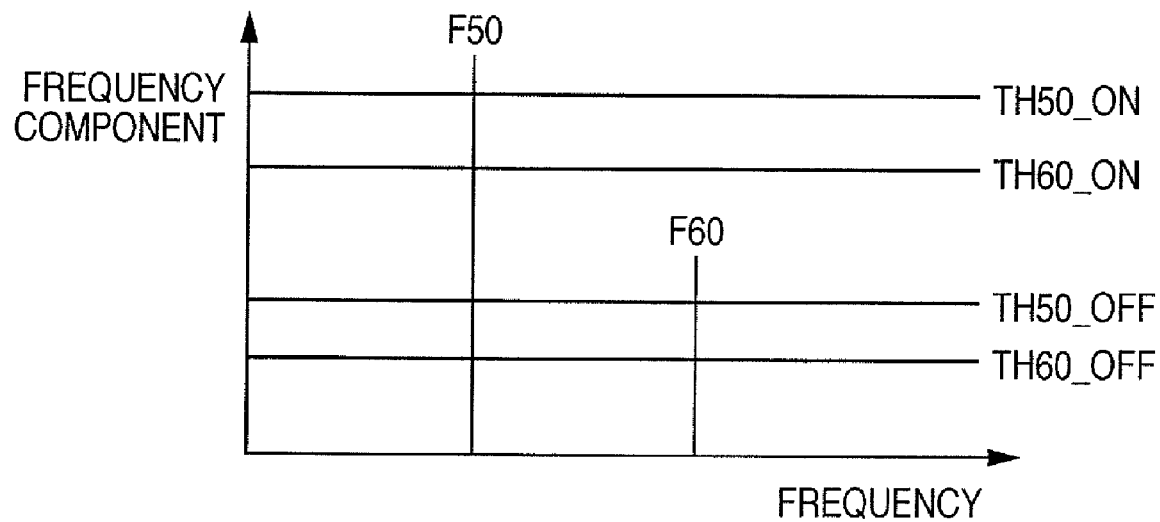

FIG. 5A shows one example of AVEi, output of the leveling unit 2, as a waveform. In FIG. 5A, the horizontal axis indicates line numbers i and the vertical axis indicates the level of the average, namely AVEi. FIG. 5B shows one example of output of the DFT unit 71. In FIG. 5B, the horizontal axis indicates the frequency and the vertical axis indicates a magnitude of the level of the frequency components. Further, the frequency component level obtained by carrying out DFT calculations for 50 Hz to detect 50 Hz frequency component using the DFT unit 71 is expressed as F50, and the frequency component level obtained by carrying out DFT calculations for 60 Hz to detect 60 Hz frequency component is expressed as F60. Four thresholds, TH50_ON, TH60_ON, TH50_OFF, and TH60_OFF, to be compared with the output of the DFT unit 71 are set in advance in the threshold processing unit 72. These thresholds have a relationship such that TH50_ON>TH50_OFF, and TH60_ON>TH60_OFF.

The threshold processing unit 72 compares these thresholds with the above-mentioned 50 Hz frequency component F50 and the 60 Hz frequency component F60 and determines the presence/absence of flicker according to a magnitude relationship thereof. In particular, the following relationships are determined:

(1) When F50<Th50_OFF and F60<TH60_OFF, then an absence of flicker is determined;

(2) When $\alpha \times$F60<F50 and F50>TH50_ON, then a presence of 50 Hz flicker is determined.

(3) When $\beta \times$F50<F60 and F60>TH60_ON, then a presence of 60 Hz flicker is determined; and (4) In a case other than the above-described (1) to (3), since the presence/absence of flicker is unclear, an absence of flicker is determined.

It is noted that in the above-described expressions, $\alpha$ is a weighted coefficient for detecting 50 Hz flicker and $\beta$ is a weighted coefficient for detecting 60 Hz flicker, and both are set to a value sufficiently larger than 1. When the frequency component of 50 Hz (or 60 Hz) is greater than the frequency component of 60 Hz (or 50 Hz) multiplied by the preset weighted coefficient, then a presence of 50 Hz (or 60 Hz) flicker is determined. The flicker frequency is specified in the above-described manner and in response to that frequency, the charge accumulation period is set to n/100 sec (n/2×50 Hz) or n/120 sec (n/2×60 Hz).

[Operation When Driving Method Changes]

Next, description is given concerning operation when the driving method has changed in accordance with a change in magnification of the electronic zoom or the like, which is a characteristic of the present invention.

Figure 11:
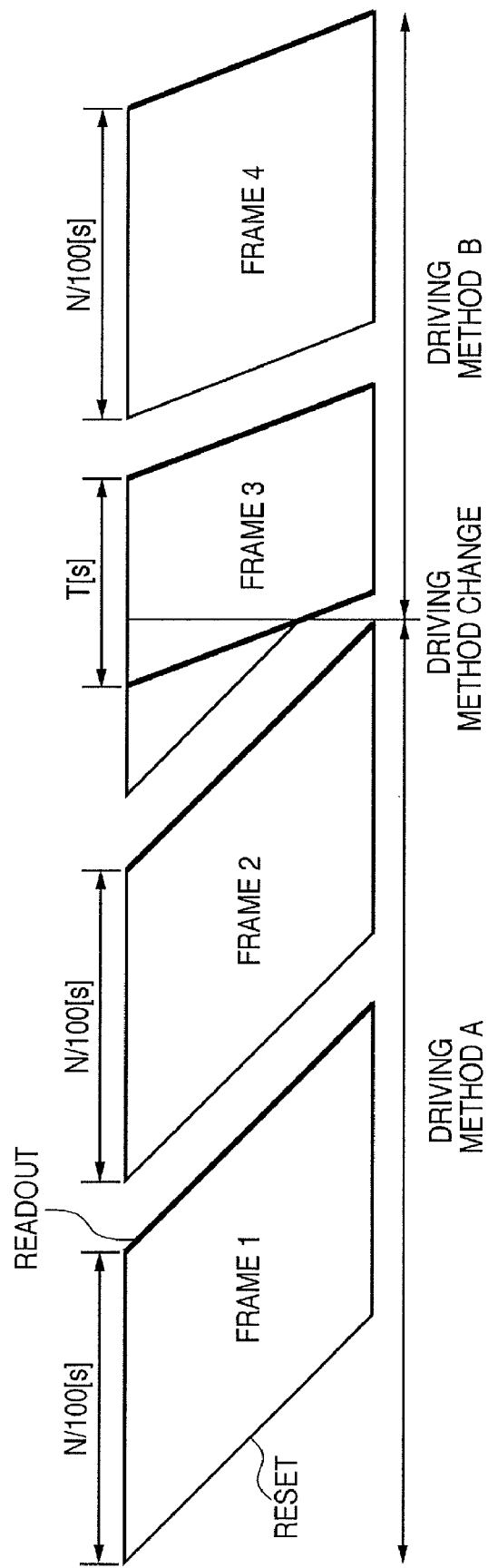
FIG. 11 shows a conventional driving timing when a driving method changes.

In the present technique, in order to prevent screen brightness disparities produced by change in reset timing due to switching of the driving method as shown in FIG. 11, resetting is carried out in line with readout timings after the image sensing driving method is switched. A characteristic of the present invention is that the reset commencement time is determined such that the frame charge accumulation period in the time of switching image sensing driving method is set to a value at which flicker is not produced. For this reason, when instruction has been given for a change in driving method during a time from commencement of readout to completion of resetting due to a change in angle of view in electronic zoom or the like, there is no switching of the driving method during readout and resetting, and the driving method is switched from the next frame. Description is given concerning specific driving timings with reference to FIG. 6 and FIG. 7.

Figure 6:
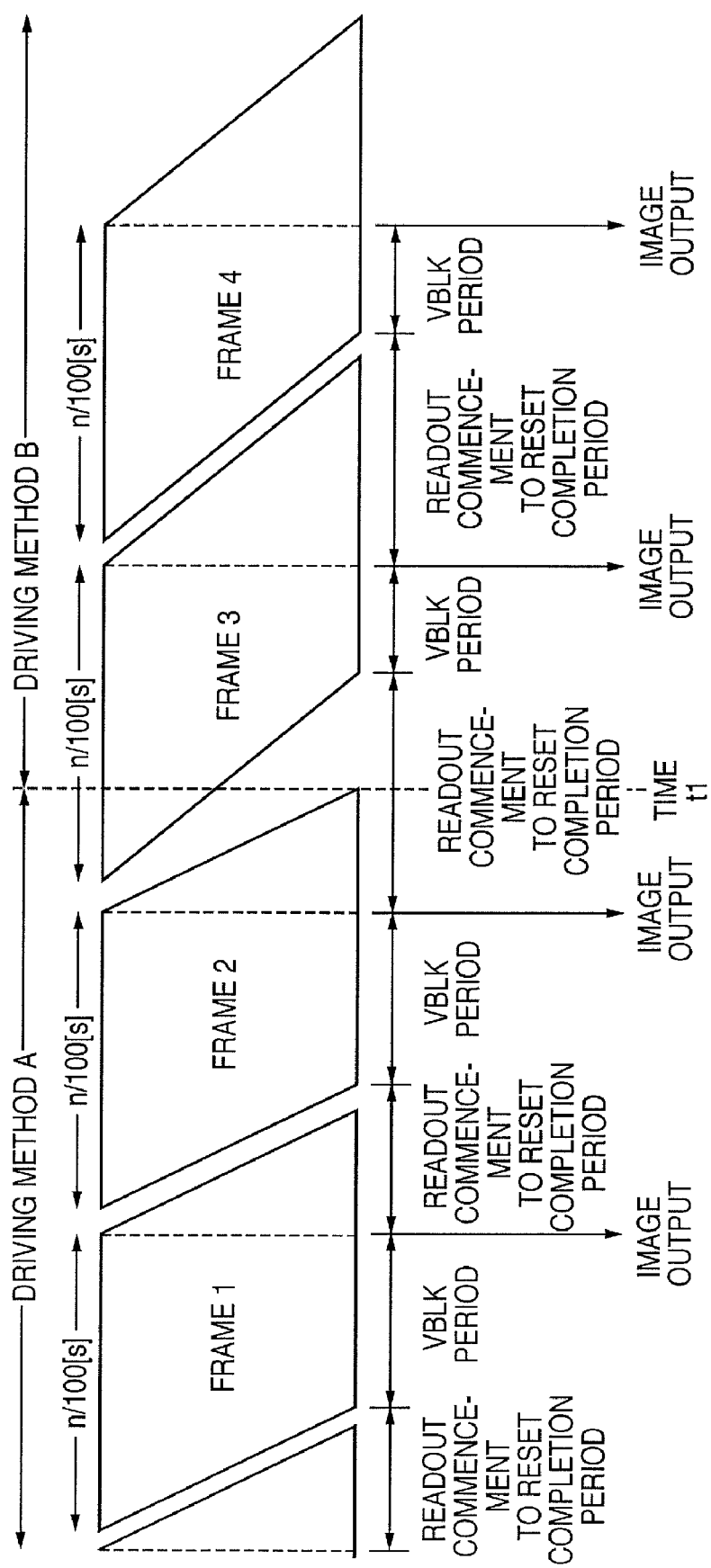
FIG. 6 shows driving timing in a case in which readout speed has become slow due to switching of driving methods according to the first embodiment of the present invention.
Figure 7:
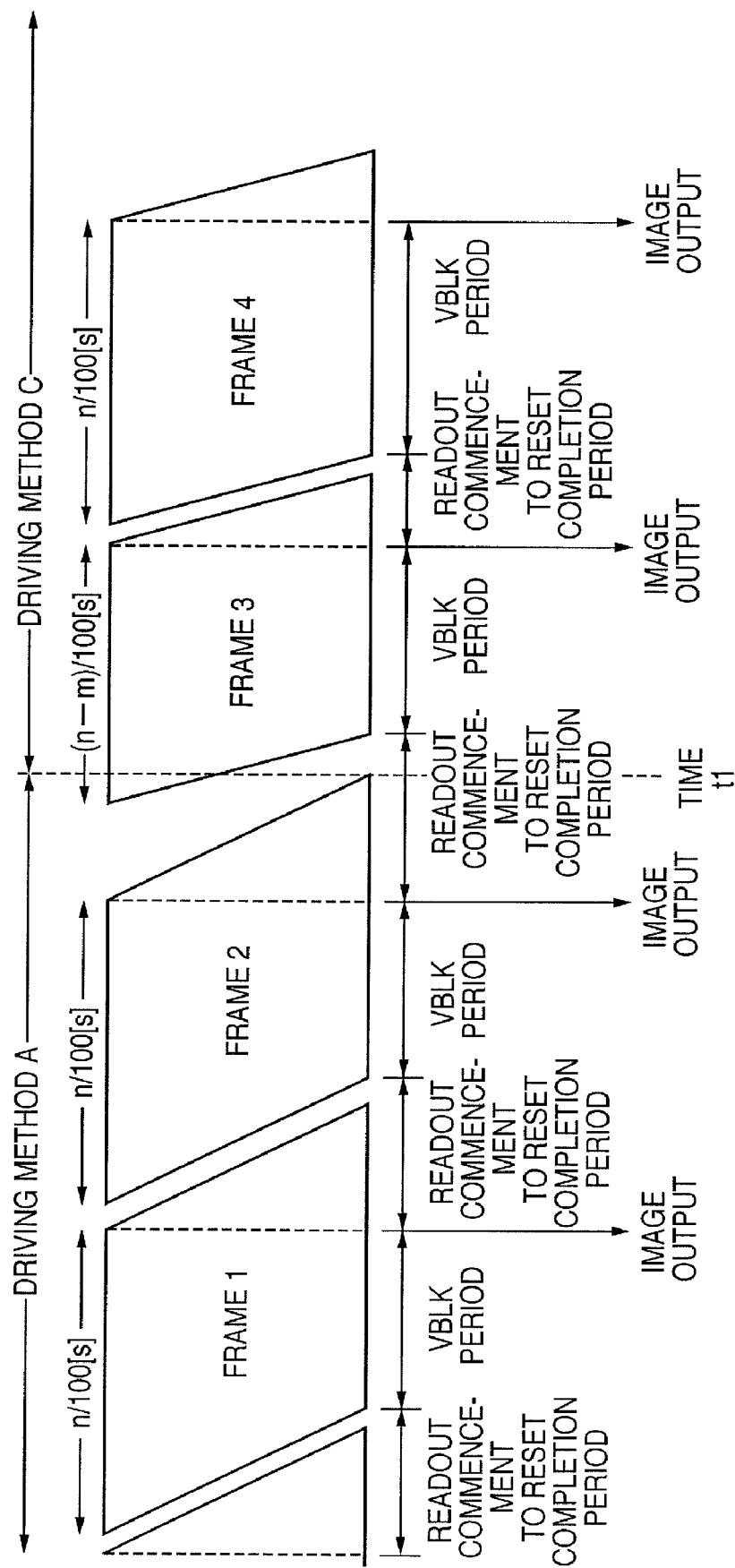
FIG. 7 shows driving timing in a case in which readout speed has become fast due to switching of driving methods according to the first embodiment of the present invention.

FIG. 6 shows a case in which a readout period has become long due to switching of the driving method, and FIG. 7 shows an opposite case in which a readout time has become shorter. It should be noted that to carry out switching of the driving method at a timing other than from the commencement of readout to the completion of resetting as stated above, switching is carried out in a vertical return period (VBLK) shown in FIG. 6 and FIG. 7.

As is evident from FIG. 6, when a horizontal scan period (a period after commencement of readout of a certain single line until commencement of readout of the next line to be read) is lengthened by switching the driving method, there is no change in the charge accumulation period n/100 sec (when the power source frequency is 50 Hz) of the first line and the final line in frame 3 where there is a switch from driving method A to driving method B.

In contrast to this, when the horizontal scan period is shortened, problems occur such as the charge accumulation period being different in the first line and the final line as was described with reference to FIG. 11, and the charge accumulation period not being multiple times ¹⁄₁₀₀ sec such that flicker is produced in the frame. When the reset interval of frame 3 is made to match the charge readout interval of a single line of driving method C to eliminate flicker, there are lines in which the resetting of frame 3 must be carried out before the reading out of frame 2, and resetting cannot be carried out.

Consequently, in the first embodiment, by setting the charge accumulation period of frame 3 to (n−m)/100 sec (n>m, m is an integer) as shown in FIG. 7, flicker is not produced and control is achieved such that the frame rates match.

Figure 8:
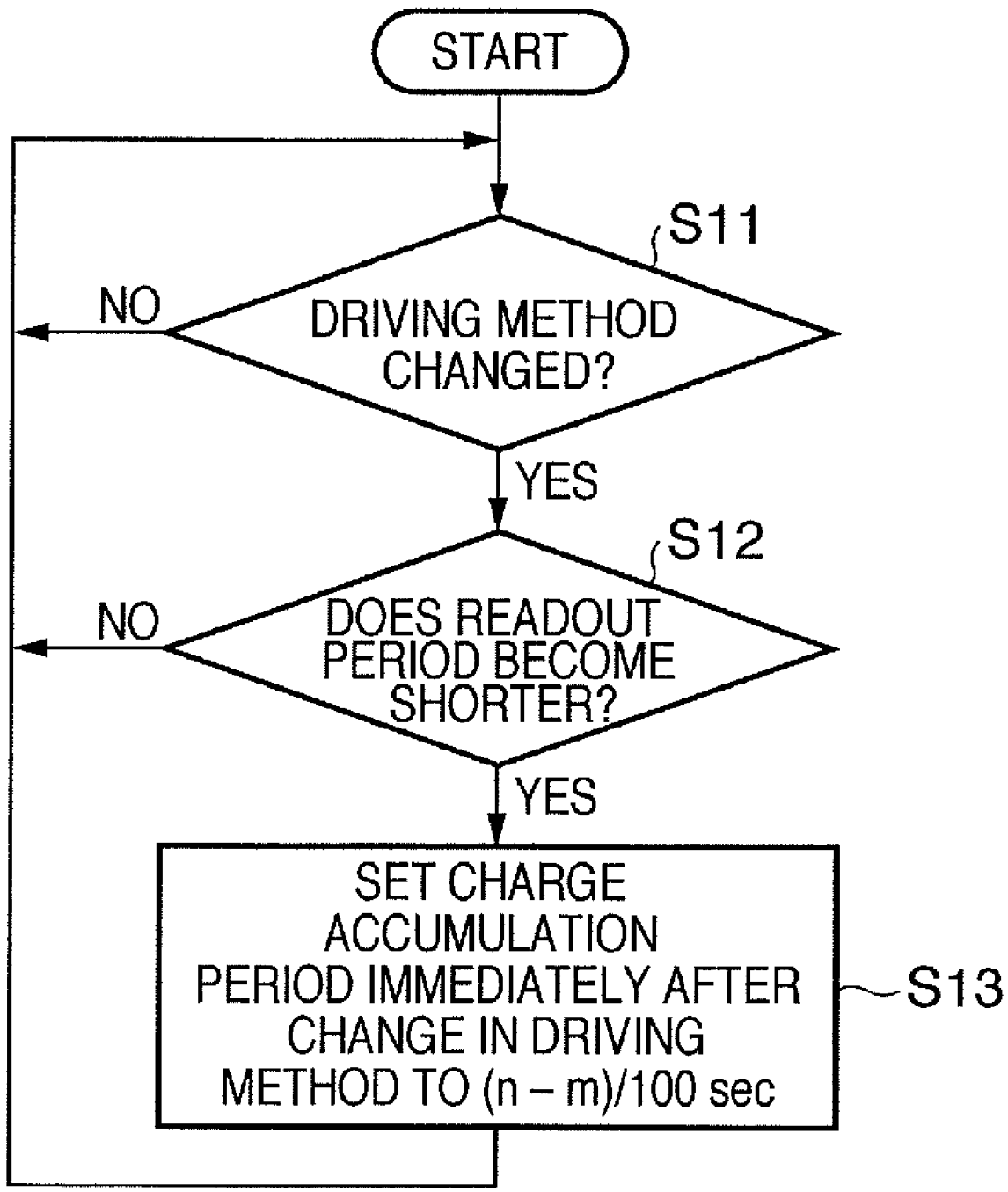
FIG. 8 is a flowchart showing a driving control procedure according to the first embodiment of the present invention.

Description is given concerning a procedure of the driving control shown in FIG. 6 and FIG. 7 with reference to a flowchart in FIG. 8. It is noted that FIG. 8 concerns control under an environment that can cause flicker, however, under an environment that does not cause flicker, flicker does not occur even without setting the charge accumulation period to (n−m)/100 sec, and therefore it is sufficient to control the charge accumulation period of the image sensor with a reset timing shown by the bold lines in FIG. 11, for example.

Now referring to FIG. 8, first in step S11, a determination is made as to whether or not the driving method is to be changed. If the driving method is not to be changed, then the procedure returns to step S11 and the determination is repeated. On the other hand, if the driving method is to be changed, the procedure proceeds to step S12 and a determination is made as to whether or not the readout period after changing the driving method is shorter than the readout period before changing the driving method. If it is shorter, then the charge accumulation period of the frame immediately after the driving method change is set to (n−m)/100 in step S13. In this way, the charge accumulation period is set to a value at which flicker does not occur. If the readout period after changing the driving method is longer, then the procedure returns to step S11 without the charge accumulation period being changed.

With this operation, it is possible to prevent occurrences of flicker when the driving method is changed by controlling the charge accumulation period of the frame immediately after the driving method change.

With the above-described first embodiment, the charge accumulation period of the frame immediately after the driving method change is controlled when switching the driving method depending on whether the horizontal scan period is lengthened or shortened by switching the driving method. By performing control in this manner, it is possible to prevent flicker with excellent efficiency even when the driving method is changed.

It should be noted that when the charge accumulation period of frame 3 is shortened immediately after the driving method change as shown in FIG. 7, the luminance of the entire frame 3 drops. For this reason, when processing the image signals of frame 3, gain may be set higher in proportion to the shortened time period of the charge accumulation period when carrying out gain adjustments by the image processing unit 19.

Second Exemplary Embodiment

A second embodiment of the present invention is described next. It is noted that the configuration of the image sensing system in the second embodiment is similar to the first embodiment, and therefore description thereof is omitted.

In the above-described first embodiment, occurrences of flicker are prevented by setting the charge accumulation period immediately after a change in driving method to (n−m)/100 sec. However, when the charge accumulation period before a change in driving method is n=1, that is, when the charge accumulation period is 1/100 seconds, occurrences of flicker cannot be prevented by changing the charge accumulation period to be smaller than this value.

Figure 9B:
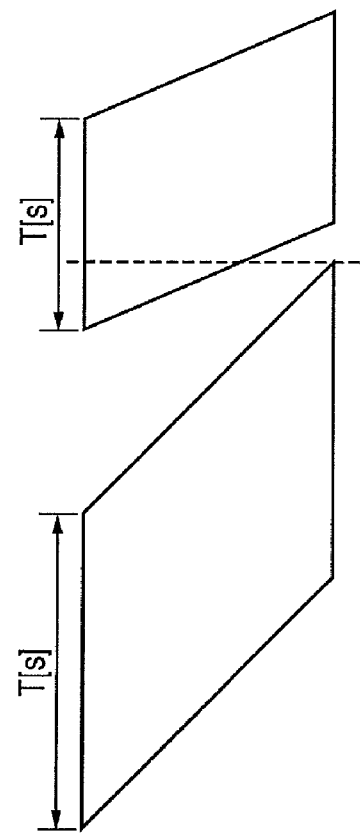
FIG. 9A and FIG. 9B show driving timing in a case in which readout speed has become fast due to switching of driving methods according to a second embodiment of the present invention.
Figure 9A:
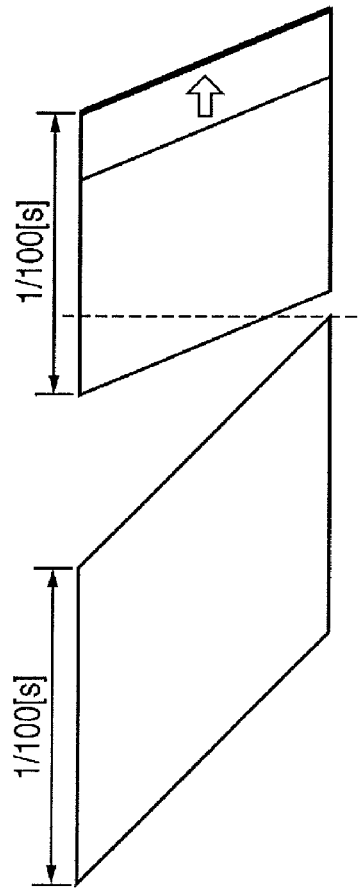
Figure 10A:
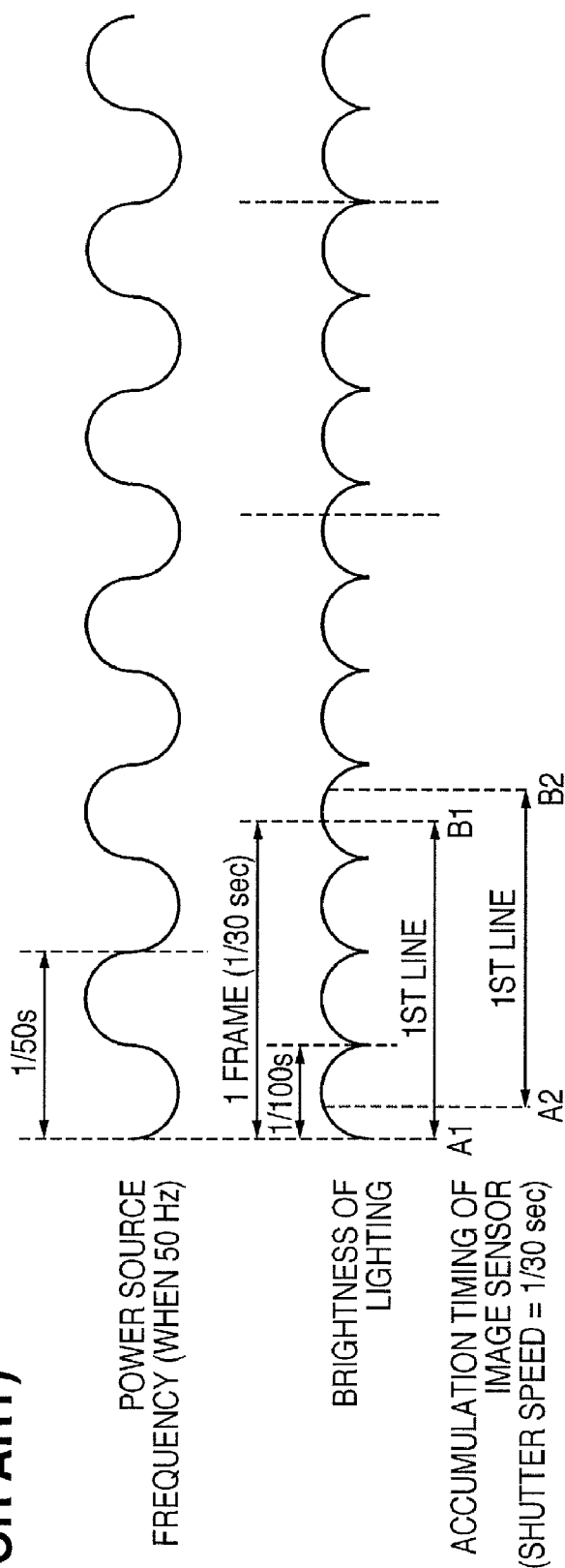
FIG. 10A and FIG. 10B are for describing a mechanism of flicker occurrence.
Figure 10B:
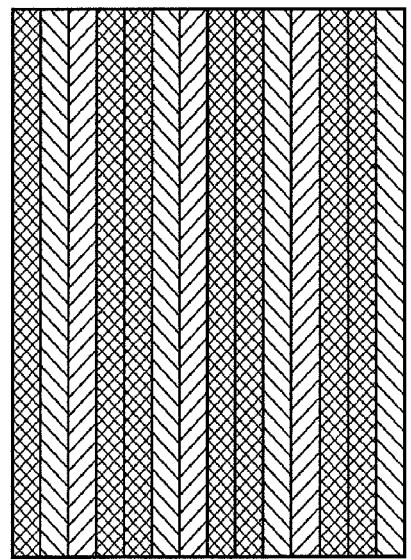

Accordingly, in the second embodiment, determination as to whether an environment causes flicker is carried out in the frame before the change in driving method, and if it is determined that the environment can cause flicker, flicker elimination is given priority and the readout commencement time is changed as shown in FIG. 9A. And if it is determined that the environment does not cause flicker, the charge accumulation period is shortened as shown in FIG. 9B so that there is no overlap between the readout timing of the frame immediately before the change in driving method and the reset timing of the frame immediately after the change. At this time, when the charge accumulation period immediately before the driving method change is T, priority is given to the frame rate without setting a restriction on a charge accumulation period T' imme-diately after the driving method change. By performing control in this manner, the charge accumulation period of the frame immediately after changing the driving method becomes shorter than a value determined by AE. For this reason, to suppress unevenness in luminance between frames, it is necessary to apply a uniform gain (for example, T/T') to the image signals of all the lines in the frame immediately after the driving method change.

With the above-described operation, by changing the readout commencement time, occurrences of flicker can be suppressed in cases where flicker is being produced when it is not possible to set a charge accumulation period that does not produce flicker. Furthermore, under an environment which does not cause flicker, flicker will not be produced even if the charge accumulation period is not an integer multiple of 1/100 seconds, and therefore a switch in the driving method can be carried out without a drop in the frame rate by appropriately shortening the charge accumulation period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-229852, filed on Aug. 25, 2006, which is hereby incorporated by reference herein in its entirety.

What is claimed is:

1. An image sensing apparatus comprising:
a first setting unit that sets a charge accumulation period in an image sensor to an integral multiple of ½ a flicker period;
a second setting unit that, if a horizontal scan period, which is a period after commencement of reading out a preset line of the image sensor until commencement of reading out a line to be read out next, is changed to be shorter, sets a charge accumulation period of the image sensor after a change in the horizontal scan period to a period that is an integral multiple of ½ the flicker period and is shorter than the charge accumulation period that has been set by the first setting unit; and
a controller that controls the image sensor to achieve the charge accumulation periods set by the first and second setting units,
wherein, if the horizontal scan period is changed to be shorter under an environment which may cause the flicker, the controller delays a reset commencement timing so that a period in which an image signal of a frame before the change in the horizontal scan period is read out from the image sensor and a period in which the image sensor is reset for a frame after the change in the horizontal scan period do not overlap, and changes a frame rate of the frame after the change in the horizontal scan period.

2. An image sensing apparatus comprising:
a first setting unit that sets a charge accumulation period in an image sensor to an integral multiple of ½ a flicker period;
a second setting unit that, if a horizontal scan period, which is a period after commencement of reading out a preset line of the image sensor until commencement of reading out a line to be read out next, is changed to be shorter, sets a charge accumulation period of the image sensor after a change in the horizontal scan period to a period that is an integral multiple of ½ the flicker period and is shorter than the charge accumulation period that has been set by the first setting unit; and a controller that controls the image sensor to achieve the charge accumulation periods set by the first and second setting units, wherein, if the horizontal scan period is changed to be shorter under an environment which does not cause the flicker, the second setting unit sets the charge accumulation period so that, without changing a frame rate, a period in which a frame before the change in the horizontal scan period is read out and a period in which the image sensor is reset for a frame after the change in the horizontal scan period do not overlap.

3. An image sensing apparatus comprising:

a first setting unit that sets a charge accumulation period in an image sensor to an integral multiple of ½ a flicker period;

a second setting unit that, if a horizontal scan period, which is a period after commencement of reading out a preset line of the image sensor until commencement of reading out a line to be read out next, is changed to be shorter, sets a charge accumulation period of the image sensor after a change in the horizontal scan period to a period that is an integral multiple of ½ the flicker period and is shorter than the charge accumulation period that has been set by the first setting unit; and a controller that controls the image sensor to achieve the charge accumulation periods set by the first and second setting units, wherein, if the horizontal scan period is changed to be longer, the second setting unit sets the charge accumulation period in the image sensor after the change in the horizontal scan period to a same charge accumulation period as before the change in the horizontal scan period.

4. An image sensing apparatus comprising:

a first setting unit that sets a charge accumulation period in an image sensor to an integral multiple of ½ a flicker period;

a second setting unit that, if a horizontal scan period, which is a period after commencement of reading out a preset line of the image sensor until commencement of reading out a line to be read out next, is changed to be shorter, sets a charge accumulation period of the image sensor after a change in the horizontal scan period to a period that is an integral multiple of ½ the flicker period and is shorter than the charge accumulation period that has been set by the first setting unit; and a controller that controls the image sensor to achieve the charge accumulation periods set by the first and second setting units, wherein the change in the horizontal scan period is carried out during a vertical return period after completion of readout of image signals of a single frame.

5. A driving control method comprising:

a first setting step of setting a charge accumulation period in an image sensor to an integral multiple of ½ a flicker period;

a second setting step of, if a horizontal scan period, which is a period after commencement of reading out a preset line of the image sensor until commencement of reading out a line to be read out next, is changed to be shorter, setting a charge accumulation period of the image sensor after a change in the horizontal scan period to a period that is an integral multiple of ½ the flicker period and is shorter than the charge accumulation period that has been set in the first setting step; and a control step of controlling the image sensor to achieve the charge accumulation periods set in the first and second setting steps, wherein, if the horizontal scan period is changed in the second setting step to be shorter under an environment which may cause the flicker, a reset commencement timing is delayed so that a period in which an image signal of a frame before the change in the horizontal scan period is read out from the image sensor and a period in which the image sensor is reset for a frame after the change in the horizontal scan period do not overlap, and a frame rate of a frame after the change in the horizontal scan period is changed in the control step.

6. A driving control method comprising:

a first setting step of setting a charge accumulation period in an image sensor to an integral multiple of ½ a flicker period;

a second setting step of, if a horizontal scan period, which is a period after commencement of reading out a preset line of the image sensor until commencement of reading out a line to be read out next, is changed to be shorter, setting a charge accumulation period of the image sensor after a change in the horizontal scan period to a period that is an integral multiple of ½ the flicker period and is shorter than the charge accumulation period that has been set in the first setting step; and a control step of controlling the image sensor to achieve the charge accumulation periods set in the first and second setting steps, wherein, if the horizontal scan period is changed to be shorter under an environment which does not cause the flicker, the charge accumulation period is set in the second setting step so that, without changing a frame rate, a period in which a frame before the change in the horizontal scan period is read out and a period in which the image sensor is reset for a frame after the change in the horizontal scan period do not overlap.

7. A driving control method comprising:

a first setting step of setting a charge accumulation period in an image sensor to an integral multiple of ½ a flicker period;

a second setting step of, if a horizontal scan period, which is a period after commencement of reading out a preset line of the image sensor until commencement of reading out a line to be read out next, is changed to be shorter, setting a charge accumulation period of the image sensor after a change in the horizontal scan period to a period that is an integral multiple of ½ the flicker period and is shorter than the charge accumulation period that has been set in the first setting step; and a control step of controlling the image sensor to achieve the charge accumulation periods set in the first and second setting steps;

a third setting step of, if the horizontal scan period is changed to be longer, setting a charge accumulation period in the image sensor after the change in the horizontal scan period to a same charge accumulation period as before the change in the horizontal scan period, wherein in the control step, the image sensor is controlled to achieve the charge accumulation periods set in the first and third setting steps.

8. A driving control method comprising:

a first setting step of setting a charge accumulation period in an image sensor to an integral multiple of ½ a flicker period;

a second setting step of, if a horizontal scan period, which is a period after commencement of reading out a preset line of the image sensor until commencement of reading out a line to be read out next, is changed to be shorter, setting a charge accumulation period of the image sensor after a change in the horizontal scan period to a period that is an integral multiple of ½ the flicker period and is shorter than the charge accumulation period that has been set in the first setting step; and a control step of controlling the image sensor to achieve the charge accumulation periods set in the first and second setting steps, wherein the change in the horizontal scan period is carried out during a vertical return period after completion of readout of image signals of a single frame.

* * * * *